L. C. REED.
METHOD OF AND APPARATUS FOR SHAVING ICE.
APPLICATION FILED JUNE 24, 1919.

1,333,094.

Patented Mar. 9, 1920.
2 SHEETS—SHEET 1.

Inventor
Lyman C. Reed
By T. G. Witherspoon
Attorney

Witness

L. C. REED.
METHOD OF AND APPARATUS FOR SHAVING ICE.
APPLICATION FILED JUNE 24, 1919.
1,333,094.
Patented Mar. 9, 1920.
2 SHEETS—SHEET 2.
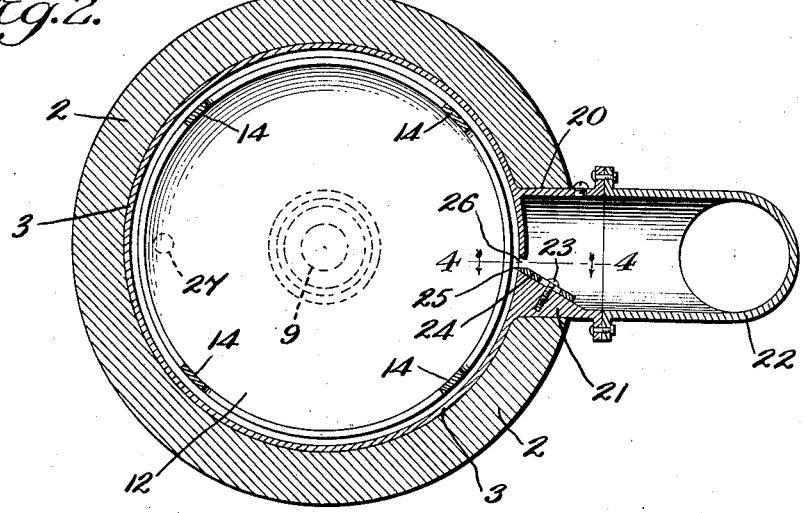
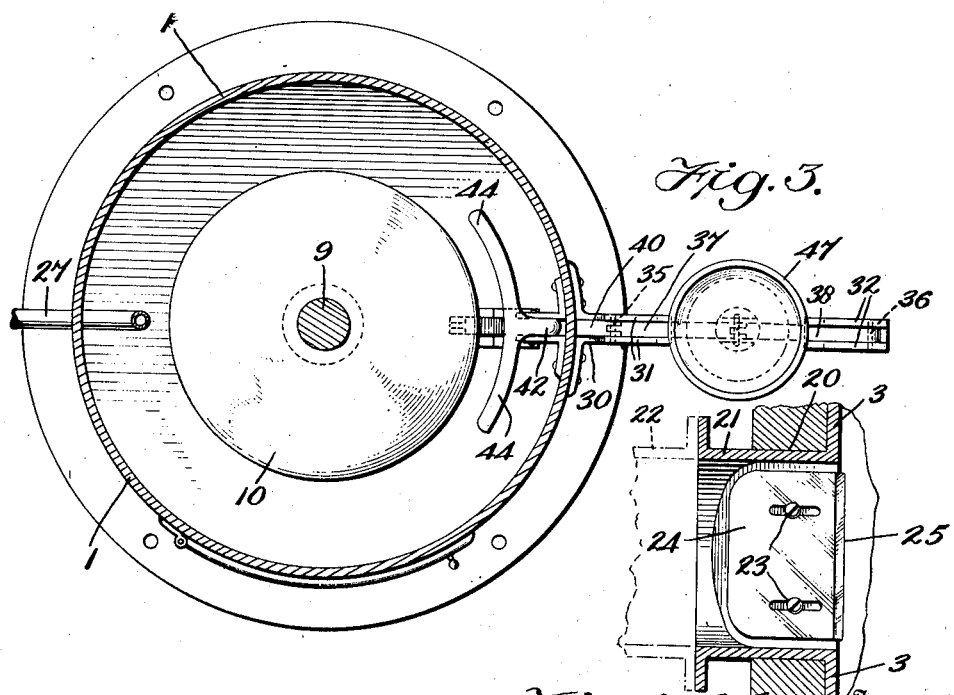
Witness
J. MacCarter
Inventor
Lyman C. Reed
By J. G. Witherspoon
Attorney

UNITED STATES PATENT OFFICE.

LYMAN C. REED, OF NEW ORLEANS, LOUISIANA, ASSIGNOR OF ONE-THIRD TO SIDNEY B. CORBY AND ONE-THIRD TO CHARLES F. RANTZ, BOTH OF NEW ORLEANS, LOUISIANA.

METHOD OF AND APPARATUS FOR SHAVING ICE.

1,333,094.  Specification of Letters Patent.  Patented Mar. 9, 1920.

Application filed June 24, 1919. Serial No. 306,455.

*To all whom it may concern:*

Be it known that I, LYMAN C. REED, a citizen of the United States, residing at New Orleans, in the parish of Orleans and State of Louisiana, have invented certain new and useful Improvements in Methods of and Apparatus for Shaving Ice; and I do hereby declare the following to be a full, clear, and exact description of the invention, such as will enable others skilled in the art to which it appertains to make and use the same.

This invention relates to improvements in ice shaving machines, and has for its object to provide a device of this character which will be simple in construction, comparatively inexpensive to manufacture, and more efficient in action than those heretofore proposed.

With these and other objects in view the invention consists in the novel details of construction and combinations of parts more fully hereinafter disclosed and particularly pointed out in the claims.

Referring to the accompanying drawings forming a part of this specification in which like parts are designated by like numerals in all the views:—

Fig. 2 is a horizontal cross sectional view, taken on the line 2—2 of Fig. 1, looking down;

Fig. 3 is a horizontal cross sectional view, taken on the line 3—3 of Fig. 1; and Fig. 4 is a fragmentary vertical sectional view, taken on the line 4—4 of Fig. 2.

Figure 1:
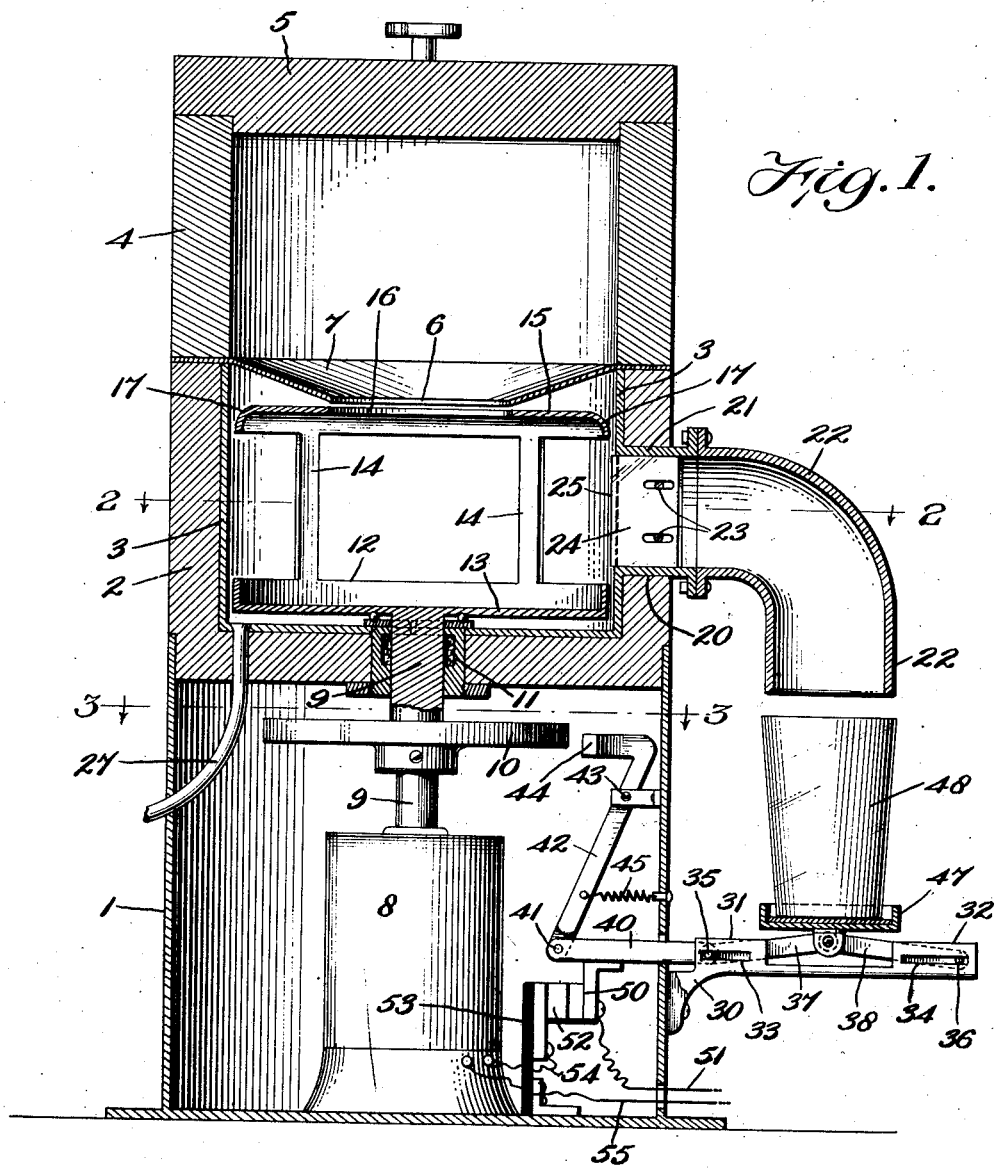
Figure 1 is a diagrammatic central vertical sectional view of a machine made in accordance with the present invention.

1 indicates a base or support, upon which is mounted the receptacle 2, of wood or other suitable material, and provided with the metal lining 3. Mounted above the said receptacle 2 is an ice magazine or reservoir 4, having a suitable cover or closure 5, and adapted to discharge ice into the said receptacle 2 through the opening 6 in the plate or disk 7.

Mounted within the base 1 is a motor 8, having the vertically disposed shaft 9, carrying the disk or brake drum 10, and extending upwardly through the gland or stuffing box 11 into the receptacle 2, all as will be clear from Fig. 1 of the drawings. Rigid with the upper portion of the said shaft 9 is the revolving ice holder or cage 12, consisting of the flanged bottom 13, from which extends the upright supports or posts 14, to which is connected the top member 15, as shown. The said top member is provided with the opening 16, registering with the opening 6 in the plate 7, and the edge of the said member 15 is preferably curved downwardly as at 17, for a purpose to be more fully disclosed below.

The receptacle 2 is provided at a suitable point with an opening 20, through which projects the tubular extension 21 of the lining 3, see Figs. 1 and 2, to which extension 21 is secured the curved discharge spout 22. Adjustably mounted within the said extension 21, as by the screw and slot connections 23, is a knife or scraper member 24, having a cutting edge 25 which projects through an opening 26 in the lining 3, as will be clear from Fig. 2. 27 designates a suitable discharge pipe for conveying away from the receptacle 2 any water which may result from the melting of the ice in the said receptacle or in the magazine 4.

Secured to the base member 1 is a bracket 30, having the ears 31 and 32, provided with the slots 33 and 34, in which are adapted to ride pins 35 and 36, carried respectively by the levers 37 and 38, see Figs. 1 and 3. A rod 40 is pivotally joined to the said lever 37 at one of its ends as by the pin 35, while its other end is connected as at 41 to a brake lever 42, pivoted at 43, and provided with a brake shoe 44. 45 indicates a spring adapted to normally hold said brake shoe out of engagement with the brake drum 10, while 47 represents a platform or rest pivoted to the levers 37 and 38, and adapted to receive a glass or other receptacle 48, as shown.

The rod 40 carries an electrical contact member 50, to which is joined a wire 51, leading from any suitable source of current supply, not shown, and the said member 50 coacts with a companion member 52, carried by an insulating bracket 53, and joined by a wire 54 to one pole of the motor 8, the other pole of which is connected as by the wire 55 to the said source of current. As will be readily apparent, the members 50 and 52 constitute a switch for conveniently making and breaking the electrical motor circuit when a glass is placed upon or taken from the rest 47, as will appear more fully below.

The operation of the device will be clear from the foregoing, but may be briefly summarized as follows:—Broken pieces of ice being introduced into the magazine 4, they will be fed down through the opening 6 in the plate 7 and into the cage 12. Now when a glass such as 48 is placed upon the platform 47, and a slight downward pressure exerted thereon, the toggle levers 37 and 38 will be brought to the position shown in Fig. 1, swinging the lever 42 about its pivot 43, thereby disengaging the brake shoe 44 from the brake drum 10, and at the same time closing the electrical circuit through the contact members 50 and 52, starting the motor 8. The revolution of the motor shaft 9 will carry with it the cage 12, and owing to centrifugal force, the ice contained therein will be thrown outwardly against the lining 3 of the chamber 2. As the pieces of ice are thus revolved they are brought into contact with the edge 25 of the knife 24, which scrapes off a portion, which escapes through the opening 26 into the spout 22 and glass 48, as will be readily apparent. When sufficient shaved ice has been deposited in the said glass it is removed from the rest 47, whereupon the spring 45 will act upon the levers 42 and 40 to break the circuit between the contacts 50 and 52, and to cause the brake shoe 44 to engage the brake drum 10, resulting in the practically instantaneous stopping of the device.

Actual practice has demonstrated that when the cage 12 is revolved at a high rate of speed, the ice therein has a tendency to climb to the top of the said cage, but by curving the top of the cage downward as shown at 17 this said tendency is overcome.

It will be observed that unlike other ice shaving machines with which I am acquainted, this machine involves the novel principles of imparting a high rotational velocity to the ice instead of to the knife as heretofore, and that therefore, I am not only enabled to utilize the rotational energy of the ice itself to accomplish the shaving and thus lessen the cost of construction, but I am also enabled to utilize the centrifugal energy accompanying said rotational energy to discharge the shaved ice into the spout 22 and glass 48.

It is obvious that those skilled in the art may vary the details of construction as well as the arrangement of parts without departing from the spirit of the invention, and therefore I do not wish to be limited to the above disclosure except as may be required by the claims.

What I claim is:—

1. In a machine of the class described the combination of a casing; a cage having an opening in said casing; means for introducing a material to be shaved into said cage; a scraping member carried by said casing; and means for rotating said cage to cause said material to pass through said opening by centrifugal force and to impinge against said member, substantially as described.

2. In a machine of the class described the combination of a cage open at its sides, and adapted to hold a material to be shaved; a knife; means to hold said knife in close proximity to the open sides of said cage; and means to rotate said cage to project by centrifugal force the material therein through said sides and against said knife while said material is in motion, substantially as described.

3. In a device of the class described the combination of a receptacle provided with an opening; a cage mounted in said receptacle; means for introducing ice into said cage; a discharge spout associated with the opening in said receptacle; a scraping member located in said discharge spout and projecting through said opening into said receptacle; means comprising an electric motor for revolving said cage, whereby the ice contained therein is brought into contact with said scraping member; means adapted to receive and hold a glass in operative relation to said spout; and means actuated by said holding means adapted to control said motor, substantially as described.

4. In a device of the class described the combination of a receptacle provided with an opening; a cage mounted in said receptacle; means comprising a magazine adapted to feed ice into said cage; a discharge spout associated with the opening in said receptacle; a scraping member projecting through said opening into said receptacle; means comprising an electric motor for revolving said cage, whereby the ice contained therein is brought into contact with said scraping member; means adapted to receive and hold a glass in operative relation to said spout; and means comprising an electric switch and a brake member actuated by said holding means and adapted to control the movements of said motor and cage, substantially as described.

5. In a device of the class described the combination of a receptacle provided with an opening; a cage mounted in said receptacle; means adapted to feed ice into said cage; a drain pipe leading from said receptacle; a discharge spout associated with the opening in said receptacle; a scraping member projecting through said opening into said receptacle; means comprising an electric motor for revolving said cage, whereby the ice contained therein is brought into contact with said scraping member; means adapted to receive and hold a glass in operative relation to said spout; means including a brake member and an electric switch adapted to control the movements of said motor and cage; a spring associated with said controlling means; and a toggle connection between said holding means and said controlling means, substantially as described.

6. In a device of the class described the combination of a support; a receptacle provided with an opening mounted on said support; a cage mounted in said receptacle; means comprising a magazine adapted to feed ice into said cage; a drain pipe leading from said receptacle; a discharge spout associated with the opening in said receptacle; a scraping member projecting through said opening into said receptacle; means comprising an electric motor for revolving said cage, whereby the ice contained therein is brought into contact with said scraping member; a brake drum carried by the shaft of said motor; a lever provided with a brake shoe pivoted to said support; a spring associated with said lever; means adapted to receive and hold a glass in operative relation to said discharge spout; a toggle connection between said holding means and said lever, adapted to cause said shoe to contact with said drum; and an electric switch associated with said toggle connection, adapted to control said motor, substantially as described.

7. A method of shaving ice and discharging the same into a receptacle, comprising imparting to said ice a velocity in a curved path and utilizing the accompanying rotational energy to shave said ice, and the accompanying centrifugal energy in discharging the same into a receptacle.

In testimony whereof I affix my signature in presence of two witnesses.

LYMAN C. REED.

Witnesses:
 E. I. LANES,
 M. L. HART.